S. Shepard
Let-Off Motion.

No. 1,517. Reissued Aug. 4, 1863.

Witnesses,
Edw. H. Sears.
L. R. Gunstus & Co.

Inventor;
S. Shepard.

N. PETERS, PHOTO-LITHOGRAPHER, WASHINGTON, D. C.

UNITED STATES PATENT OFFICE.

SILAS SHEPARD, OF TAUNTON, MASSACHUSETTS.

IMPROVEMENT IN LOOMS.

Specification forming part of Letters Patent No. 36,029, dated July 29, 1862; Reissue No. 1,517, dated August 4, 1863.

*To all whom it may concern:*

Be it known that I, SILAS SHEPARD, of Taunton, in the county of Bristol and State of Massachusetts, have invented a new and Improved Let-Off Motion for Looms; and I do hereby declare that the following is a full, clear, and exact description of the same, reference being had to the accompanying drawings, forming part of this specification, in which—

Figure 1:
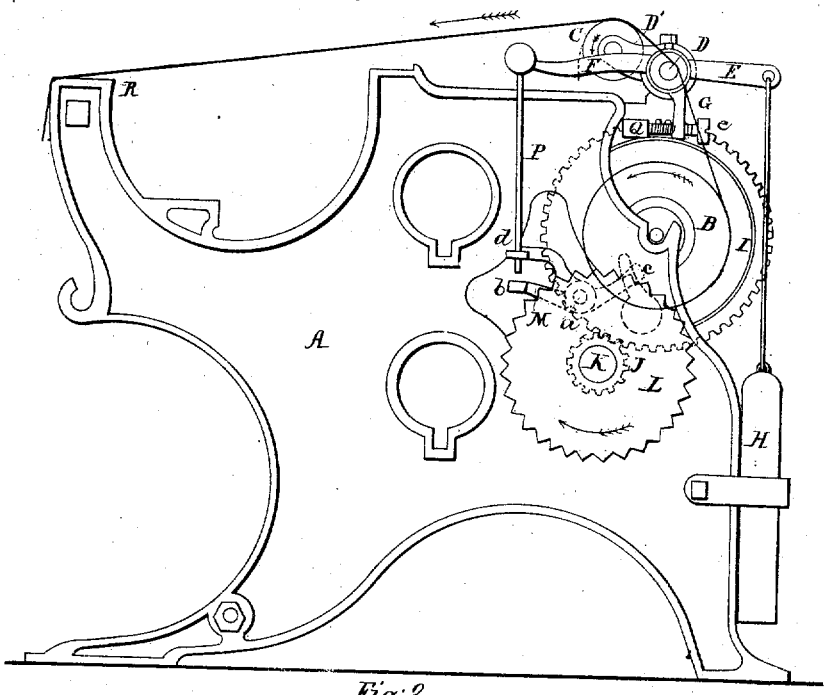
Figure 2:
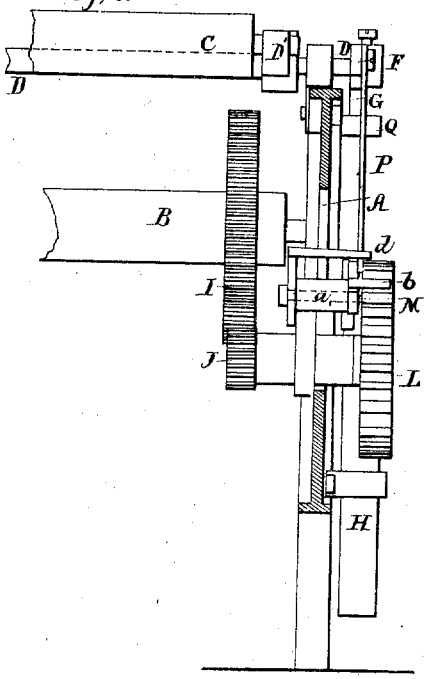
Figure 3:
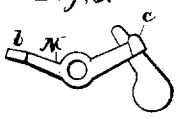

Figure 1 is a side view of my improved let-off motion; Fig. 2, a front view of the same, and Fig. 3 a side view of the detent escapement-lever.

My invention consists in the connection of a vibrating whip-roll, or it equivalent, with mechanism for producing an intermittent delivery of the warp-yarn from its beam, together with a uniform tension upon the warp.

The drawings illustrate the invention as applied to a common power-loom, in which A is the frame, B the yarn or warp beam, and R the breast-beam. C is the whip-roll, rotating in bearings in the rocker-arms D′, which are fixed to the rock-shaft D, this shaft and the whip-roll and rocker-arm being capable of vibration in bearings on the frame. The warp passes from the beam (to whatever extent filled with yarn) against the rock-shaft, thence over the whip-roll, and from thence directly to the breast-beam and to thetake-up. (Not shown in the drawings.) The position o fthe warp is denoted by a red line seen in Fig. 1.

The operation of the take-up mechanism and of the lay being well known, and forming no part of my invention, it is not necessary herein to describe them.

The shaft D is placed directly over the warp-beam, and the whip-roll is located between said shaft and breast-beam at a suitable elevation above the line drawn from the rock-shaft to the breast-beam. By this arrangement an angle or bend is formed in the warp-threads where they pass over the whip-roll.

Strain upon the warp between the rocker-shaft and breast-beam has a tendency to strengthen the warp between the breast-beam and rock-shaft, which tendency bears the whip-roll downward.

One end of the rock-shaft overhangs its bearing, and has thereupon the lever E, a continuation of which is marked F′, and a branch extending downward therefrom is marked G′. To the outer end of E a weight, H, is hung, and from the outer end of F′ a rod, P, is pendent, being guided in its movement in a hole in the ear *d*. A short shaft, K, is journaled in the frame, and bears on the end inside the frame a pinion which meshes into the gear I, fixed upon the yarn-beam. Upon the other end of K is fixed an escapement-wheel, L. Upon a stud, *a*, is hung a detent-lever, so arranged that its pawls or teeth *c* and *b* can operate upon the escapement in the manner usual for such devices.

As reciprocating or rocking motion is imparted to the rock-shaft by tension on the warp, similar motion is given to the lever E, and the weight H is thereby raised or lowered and the rod P moved up and down.

Too great downward motion of the weight H, and consequent upward vibration of the whip-roll, is prevented by impingement of a screw, *e*, in G on the stop Q, fixed to the frame; but too great motion of the weight may be checked by allowing it to come in contact with a fixed support, or by any other suitable means. The tendency of the weight is to counterbalance the weight of the whip-roll and the ordinary strain produced on the yarn by the take-up by keeping the roll C pressed upward against the warp-yarns.

When the rod P is depressed by depression of the whip-roll, its lower end strikes upon and vibrates the detent-lever M, so as to bring the tooth or pawl *b* into gear with the notches of the escapement-wheel, and when the tension of the warp-yarn is relieved from the stroke of the lay, then the weight H falls, which allows the tooth *b* to rise, the escapement L turning until the tooth *c* drops fully into gear with the escapement-wheel notches, which prevents further motion of the escapement till the whip roll is again depressed. The motion of the escapement described is equal to the distance apart of two of its adjacent teeth, and permits the warp-beam to turn and let off yarn, which is, however, kept at a uniform tension during and after the let-off by the weight H keeping the whip-roll or its equivalent pressed upward against the warp-yarn.

The lever M or the pallet is so constructed or applied that when in its normal position the tooth or pawl *c* keeps in engagement with the teeth of the escapement-wheel, confining or locking it in position.

The direction of motion of the escapement-wheel, the warp-beam, and the warp-yarn is shown by the arrows seen in Fig. 1.

The number of teeth or notches in the escapement-wheel, the number of teeth in the pinion J, and in the gear I on the yarn-beam should be so proportioned as to allow of a movement of about nine notches of the escapement to every ten beats of the lay when using up the last of the yarn wound upon the warp-beam; but this may be varied to the proportion of two to one.

The operation of the mechanism is as follows: As the lay beats up against the cloth and as the cloth is wound upon its beam, taken up by any take-up mechanism, tension or strain is produced upon the warp-yarn and warp-beam. The warp-beam is, however, through the gears I and J, escapement-wheel L, and tooth *c* on the lever M, locked or kept from rotating, and the amount of warp required in the weaving process is furnished from the straightening of the line of warp-threads between the rocker shaft and breast-beam R, such straightening drawing down or depressing the whip-roll C in the arc of a circle shown in a dotted line in Fig. 1 and in the direction indicated by the arrow thereupon. This depression of the whip-roll turns the rocker-shaft D and carries down the arm F and rod P. Successive beats of the lay and the action of the take-up continue to depress the whip-roll by straightening the warp, and the end of P depresses that end of M which bears the tooth *b*, causing this to engage in the notches of the escapement-wheel, and the tooth *c* to rise and become disengaged therefrom, which result is produced by the greatly-increased tension given to the warp by the blows of the lay. As the lay beats back from the blow which fully depressed the lever M, the yarn is relieved from the tension produced by the stroke of the lay, and the weight H falls, and the beam turns and lets off.

It is obvious that the arm F and rod P may be dispensed with, and the necessary vibrations of the lever M may then be given by connecting the arm E to that end of M upon which the tooth or pawl *c* is borne.

When the beam is filled with yarn, it is obvious that more of it is released at each movement of the escapement than when less is upon the beam. The only result of this, however, is that the escapement is operated more often as the quantity upon the beam diminishes, the tension upon the yarn being kept equal by the vibration of the whip-roll, governed by the weight, without regard to the frequency of the let-off movement of the yarn-beam, so that the tension produced is equal from a full to an empty beam.

The arrangement of the rock-shaft and whip-roll, as shown and described, is such that the yarn always bears upon the rock-shaft before passing to the whip-roll, so that the angle of the yarn over the whip-roll and between the breast-beam and rock-shaft is constant, except in so far as it is changed by the vibration of the whip-roll, while the angle or inclination of the yarn where it passes from the yarn-beam to the rock-shaft changes with the quantity of yarn on the beam; but this change does not affect the angle of the yarn between the rock-shaft and the breast-beam, which is such as to cause the tension upon the warp-yarn to act to depress the whip-roll more nearly at right angles with a radial line drawn through the whip-roll from the rock-shaft center than would be the case if the warp passed direct from the beam to the whip-roll.

I claim—

The combination of an escapement mechanism (connected to the warp-beam by means of gearing) with the mechanism by which the yarn is let off from the beam by its tension and the stroke of the lay, and by which uniform tension is maintained upon the warp, all arranged and operating together substantially as described.

S. SHEPARD.

Witnesses:
EDW. H. SEARS,
L. R. CHESBROUGH.